United States Patent
Stefani

(10) Patent No.: US 10,059,444 B2
(45) Date of Patent: Aug. 28, 2018

(54) SYSTEMS AND METHODS FOR INTEGRATING AUTOMATIC DEPENDENT SURVEILLANCE-BROADCAST CAPABILITIES IN SMALL UNMANNED AIRCRAFT SYSTEM (SUAS) OPERATIONS

(71) Applicant: ARINC Incorporated, Annapolis, MD (US)

(72) Inventor: Rolf Stefani, West River, MD (US)

(73) Assignee: ARINC Incorporated, Annapolis, MD (US)

(*) Notice: Subject to any disclaimer, the term of this patent is extended or adjusted under 35 U.S.C. 154(b) by 536 days.

(21) Appl. No.: 14/180,312

(22) Filed: Feb. 13, 2014

(65) Prior Publication Data

US 2016/0101855 A1 Apr. 14, 2016

(51) Int. Cl.
*B64C 39/02* (2006.01)
*G05D 1/00* (2006.01)
*G08G 5/00* (2006.01)

(52) U.S. Cl.
CPC ......... *B64C 39/024* (2013.01); *G05D 1/0016* (2013.01); *G08G 5/0008* (2013.01);
(Continued)

(58) Field of Classification Search
CPC ............ B64C 39/024; B64C 2201/146; B64C 2201/12; B64C 2201/14;
(Continued)

(56) References Cited

U.S. PATENT DOCUMENTS

2007/0152814 A1* 7/2007 Stefani ............... G08B 21/0269
340/539.22
2009/0248287 A1* 10/2009 Limbaugh ............ G08G 5/0013
701/120
(Continued)

OTHER PUBLICATIONS

Stark et al., "ADS-B for Small Unmanned Aerial Systems: Case Study and Regulatory Practices," May 2013.*
(Continued)

*Primary Examiner* — Courtney D Heinle
(74) *Attorney, Agent, or Firm* — Angel N. Gerdzhikov; Donna P. Suchy; Daniel M. Barbieri

(57) ABSTRACT

A system and method are provided to support accommodating safe integration of small unmanned aircraft systems (sUASs) into the National Airspace Structure in the United States and to augment previously untracked aircraft positions by opportunistically acquiring their position information and forwarding this information to other systems for display. The disclosed schemes integrate automatic dependent surveillance-broadcast (ADS-B) capabilities in sUASs by providing an ADS-B receiver on the small unmanned aircraft or in association with a ground-based sUAS control and communication workstation. Processing of the ADS-B information is integrated with processing of acquired information on sUAS aerial platform operations. Processed integrated information is displayed locally on the workstation and transmitted to other facilities to be remotely displayed. Acquired position information for the sUAS aerial platform and manned aerial vehicles in a vicinity of the sUAS aerial platform are converted to formats commonly used by air traffic control systems.

10 Claims, 3 Drawing Sheets

(52) U.S. Cl.
CPC ......... *G08G 5/0013* (2013.01); *G08G 5/0069* (2013.01); *G08G 5/0078* (2013.01); *G08G 5/0082* (2013.01); *B64C 2201/12* (2013.01); *B64C 2201/14* (2013.01); *B64C 2201/146* (2013.01)

(58) Field of Classification Search
CPC ........ G05D 1/0011–1/005; G08G 5/00–5/065; G01S 13/91–13/9303
See application file for complete search history.

(56) References Cited

U.S. PATENT DOCUMENTS

| | | | | |
|---|---|---|---|---|
| 2010/0066604 | A1* | 3/2010 | Limbaugh | G08G 5/0013 342/357.31 |
| 2010/0103022 | A1* | 4/2010 | Stefani | G08G 5/0013 342/30 |
| 2010/0315281 | A1* | 12/2010 | Askelson | G01S 7/003 342/30 |
| 2011/0163908 | A1* | 7/2011 | Andersson | G01S 5/0072 342/36 |
| 2012/0092208 | A1* | 4/2012 | LeMire | G01S 13/87 342/29 |
| 2014/0236469 | A1* | 8/2014 | Callan | G08G 5/045 701/301 |
| 2014/0324255 | A1* | 10/2014 | Siddiqi | B64D 25/00 701/14 |
| 2016/0012731 | A1* | 1/2016 | Limbaugh | G08G 5/0069 701/120 |
| 2016/0035225 | A1* | 2/2016 | Berckefeldt | G08G 5/0078 342/32 |

OTHER PUBLICATIONS

"Air Traffic Control Reporting System (ATC-RS)," http://www.kuttatech.com/KuttaTechPDF/Kutta%20-%20ATCRS.pdf, as archived on Sep. 10, 2011.*

* cited by examiner

SYSTEMS AND METHODS FOR INTEGRATING AUTOMATIC DEPENDENT SURVEILLANCE-BROADCAST CAPABILITIES IN SMALL UNMANNED AIRCRAFT SYSTEM (SUAS) OPERATIONS

This application is related to U.S. patent application Ser. No. 13/792,255, entitled "SYSTEMS AND METHODS FOR SMALL UNMANNED AIRCRAFT SYSTEMS (sUAS) TACTICAL TRACKING AND MISSION DATA ACQUISITION," filed on Mar. 11, 2013, published as U.S. Patent Application Publication No. 20140257692A1 on Sep. 11, 2014, and patented on Nov. 11, 2014 as U.S. Pat. No. 8,886,459, and U.S. patent application Ser. No. 13/792,259, entitled "SYSTEMS AND METHODS FOR REAL-TIME DATA COMMUNICATIONS AND MESSAGING WITH OPERATORS OF SMALL UNMANNED AIRCRAFT SYSTEMS (sUAS)," filed on Mar. 11, 2013, published as U.S. Patent Application Publication No. 20150170524A1 on Jun. 18, 2015 and patented as U.S. Pat. No. 9,105,184 on Aug. 11, 2015, the disclosures of which are hereby incorporated by reference herein in their entirety.

BACKGROUND

1. Field of the Disclosed Embodiments

This disclosure relates to systems and methods for integrating automatic dependent surveillance-broadcast (ADS-B) capabilities in Small Unmanned Aircraft System (sUAS) operations.

2. Related Art

Unmanned aerial vehicles (UAVs), as that term may be broadly interpreted, have existed in many different forms since the earliest days of flight. The earliest implementations involved the use of balloons, for example, for battle area reconnaissance and surveillance. This disclosure will use the term "Unmanned Aircraft Systems (UAS(s))" to refer to a particular class of UAVs that excludes, for example, missiles, unmanned rockets and weather and/or reconnaissance balloons. UASs are that broad class of UAVs, often commonly referred to as drones and/or remotely piloted vehicles (RPVs) that are differentiated from other UAVs, such as those enumerated above, because the UAS platforms are capable of controlled flight from launch, through in-flight operations, to recovery and/or landing in a manner similar to a conventional piloted airplane or helicopter. The control schemes for these UASs may include real-time or near-real-time control of the flight profile by an operator at a remote control console in constant communication with a particular UAS. Alternatively, the control schemes for these UASs may include execution of preplanned and preprogrammed flight plans, which are autonomously executed by a particular UAS. Depending on a sophistication of the UAS, the control scheme may include an integration of both of the above-discussed control schemes such that a single "flight" may include periods of remote operator control and periods of preprogrammed control.

In early implementations, UASs tended to be small aerial vehicles with significant payload size, weight and power (SWAP) limitations. Based on very strict SWAP constraints, the capabilities of early UASs were limited and heavily dependent on technology miniaturization. These UASs saw early operational deployment for use by, for example, militaries worldwide to provide, among other missions, battle area reconnaissance and surveillance, and spoofing of adversary threat weapons systems when augmented with radar reflectors, for example, to act as decoys. The payload constraints were a significant limiting factor in the deployment of the earliest UASs for these and other military uses. Nonetheless, the popularity and efficacy of these systems on the battlefield were readily recognized. Missions could be undertaken that did not put aircrew in unnecessarily dangerous situations. Low cost added to the operational employment advantage for military-operated UASs in that these platforms were more readily expendable than other assets.

A desire to expand the role of UASs in support of military operations led to a requirement to develop UASs with increased payload capacity. Increased payload capacity had a number of advantages. First, some portion of an additional payload capacity could be dedicated to the carriage of additional fuel to extend ranges, and potential loiter times, for the systems in-flight. Second, some portion of an additional payload capacity could be dedicated to the carriage of a broader array of sensors to support expanded mission requirements, particularly sensors of all types that did not need to be specifically modified or miniaturized to be accommodated by the UAS. Third, some portion of an additional payload capacity could be dedicated to the carriage of ordnance carriage for delivery on, and use against, targets of varying descriptions.

Having proved their usefulness on the modern battlefield, employment of UAS platforms and the associated technology was studied for fielding in a broader array of operational scenarios far beyond military-only use. Many commercial entities and law enforcement agencies began developing operational requirements that could be filled through adaptive use of UAS technology. A focus of the development efforts for UAS platforms returned to exploring operation of smaller, more economical UAS platforms. Several manufacturers have worked with customer entities and agencies to develop, test and manufacture small UAS (sUAS) aerial platforms, which are often lightweight, low cost aerial platforms that may be remotely piloted by an sUAS operator at an sUAS control and communication console or workstation in fairly close proximity to, often visual sight of, the sUAS aerial platform in operation. To date, sUAS aerial platforms have been limitedly deployed in support of law enforcement and other agency or individual surveillance requirements. sUAS aerial platforms play an increasing role in many public service and public support missions, which include, but are not limited to, border surveillance, wildlife surveys, military training, weather monitoring, fire detection and monitoring, and myriad local law enforcement surveillance support missions.

The use of sUAS aerial platforms typically occurs outside of usable radar environments (even if the platforms were radar identifiable). sUAS aerial platform operations are conducted generally below 400 feet AGL and within line of sight of an sUAS operator at an sUAS ground-based control and communication workstation. The operator may be co-located in the field with an advanced or augmented laptop computer, or like device, as the ground-based control and communication workstation for operational control of the sUAS aerial platform in flight. The operator may be, for example, local, state, regional or national law enforcement operating the sUAS aerial from his or her law enforcement vehicle, or may be a contract "pilot" operating the sUAS aerial platform from the tailgate of his or her pickup truck. Operations of the sUAS aerial platforms may involve cooperative control of the platforms, data exchange with the platforms, and/or video surveillance recovery from the platforms, among other capabilities.

A challenge to increasingly expanded employment of sUAS aerial platforms generally in many domestic, non-military scenarios, particularly in the United States, stems from the platforms not having aircrew onboard that are able (1) to detect other close and/or conflicting aerial traffic and/or (2) to effect timely maneuvers to avoid collisions based on visual- or sensor-detected proximity to such conflicting aerial traffic.

U.S. patent application Ser. No. 13/792,255 (the 255 application), entitled "SYSTEMS AND METHODS FOR SMALL UNMANNED AIRCRAFT SYSTEMS (sUAS) TACTICAL TRACKING AND MISSION DATA ACQUISITION," and Ser. No. 13/792,259 (the 259 application), entitled "SYSTEMS AND METHODS FOR REAL-TIME DATA COMMUNICATIONS AND MESSAGING WITH OPERATORS OF SMALL UNMANNED AIRCRAFT SYSTEMS (sUAS)," which are incorporated by reference herein in their entireties, generally discuss systems and methods by which autonomous or semi-autonomous sUAS operations may be effectively integrated into current communications and control infrastructures for the national airspace system (NAS).

SUMMARY OF THE DISCLOSED SUBJECT MATTER

In a particular event area, it is anticipated that a number of sUAS aerial platforms may be operated line-of-sight, as outlined above. In the same event area, it is further anticipated that a number of manned aircraft, including helicopters, may be operated. Typically, these manned aircraft may generally be equipped with automatic dependent surveillance-broadcast (ADS-B) radios or transponders. Those of skill in the art understand ADS-B systems provide a cooperative surveillance technology for tracking aircraft. The ADS-B-equipped aircraft determines its own position via any one of a number of local or global geographic positioning means and periodically broadcasts its geographic position, including altitude, over a particular radio frequency to a remote tracking facility or agency, or to other cooperating aircraft. ADS-B can provide more precise position reporting than radar and it is not constrained to radar lines of sight.

ADS-B operations tend to be limited only by emplacement of ground receiving antenna placements. It is economically and logistically unreasonable to attempt to emplace ADS-B receiving nodes to cover the entire NAS at all altitudes. Realistically, there is no practical need to do so either, except as may arise in the context of potentially conflicting sUAS and manned aircraft operations in a particular event area. In such circumstances, an ability of an sUAS operator and others to avail themselves of all available surveillance and flight safety systems to provide a complete overall situational awareness picture for the event area may be of paramount importance to flight safety, non-interference and collision avoidance among participating aerial vehicles.

It may be advantageous to provide a local ADS-B receiver at the sUAS control and communication workstation to assist the sUAS operator in building a complete local situational awareness picture for all cooperating "aircraft" in a particular local operating area surrounding the sUAS aerial platform operations.

Further, the ability to establish communications links between the sUAS control and communication workstation and remote tracking agencies or other remote stakeholders in the manner described in the 259 application may provide an ability to translate and transmit the complete local situational awareness display to those remote stakeholders. Specifically, the 259 application describes systems and methods for forwarding acquired position information to separate servers that can augment and provide remote graphical display of the sUAS aerial platforms' intended routes of flight (flight planned routes). The actual position of the sUAS aerial platform may be received from the sUAS aerial platform via the sUAS ground-based control and communication workstation and automatically updated on the remote display substantially in real-time. The 259 application specifies that the acquired position information for the sUAS aerial platform may be converted to a format commonly used by aviation and air traffic control systems, such as, for example, into a pseudo ADS-B (FANS 1/A like) track message to share with other systems, including FAA/ATC systems.

It would be further advantageous to provide a scheme whereby locally collected ADS-B data from participating aircraft may be formatted for transmission from the sUAS control and communication workstation to other stakeholders across established communication paths. It is anticipated that the data will be delivered to, for example, an FAA/ATC facility by, for example, being delivered to FAA/ATC automated systems, in a manner and format that makes it capable of being readily integrated for display on any number of FAA/ATC display systems in control towers, flow control or mission control centers, and the like.

Exemplary embodiments may provide systems and methods that are uniquely configured to enhance overall local situational awareness for the sUAS operator by providing additional information with regard to position keeping for all air traffic operating in a vicinity of the sUAS operations.

Exemplary embodiments may mount an ADS-B receiver on a small unmanned aircraft as an sUAS aerial platform, or otherwise may communicatively connect an ADS-B receiver to an sUAS ground control and communication workstation, to provide a means by which to locally collect ADS-B position keeping transmitted by manned aircraft operating in a vicinity of the sUAS operations.

Exemplary embodiments may integrate ADS-B data into a useful interactive, web-based tool (such as ARINC's proprietary Web Aircraft Situation Display (WebASD$^{SM}$)) that provides stakeholders with real-time, graphical flight-following information.

Exemplary embodiments may supplement the established capacity of the sUAS control and communication workstation to acquire position information regarding an sUAS platform by allowing the workstation to collect additional information regarding all aircraft operating in close proximity.

Exemplary embodiment may forward the acquired position information to a separate server that can augment and provide graphical display (WebASD$^{SM}$ and other graphical products) of the sUAS and other aircraft operations to automatically update a remote display substantially in real-time with own platform information as well as collected aircraft ADS-B information that may not be otherwise available to the remote facility for display.

Exemplary embodiments may be used to display an sUAS mission, e.g., projected flight plan and/or route, and to track and display the actual real-time location of the sUAS as it operates, supplemented with position keeping information on other airborne vehicles operating in a vicinity, to a plurality of interested and participating agencies in an easy-to-follow format that is integrated with the existing display capabilities of the interested and participating agencies.

Exemplary embodiments may provide a capability for interested parties, including DHS, DOJ, FAA, local law enforcement agencies and commercial sUAS operators, to monitor the sUAS missions in real time as well as to provide a mechanism for these interested parties to have an enhanced overall situational awareness picture of additional aerial operations in a vicinity of the sUAS through the collection of ADS-B information from other platforms.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for integrating automatic dependent surveillance-broadcast (ADS-B) capabilities in enhanced situational awareness for sUAS operations, will be described, in detail, with reference to the following drawings, in which.

DESCRIPTION OF THE DISCLOSED EMBODIMENTS

Figure 1:
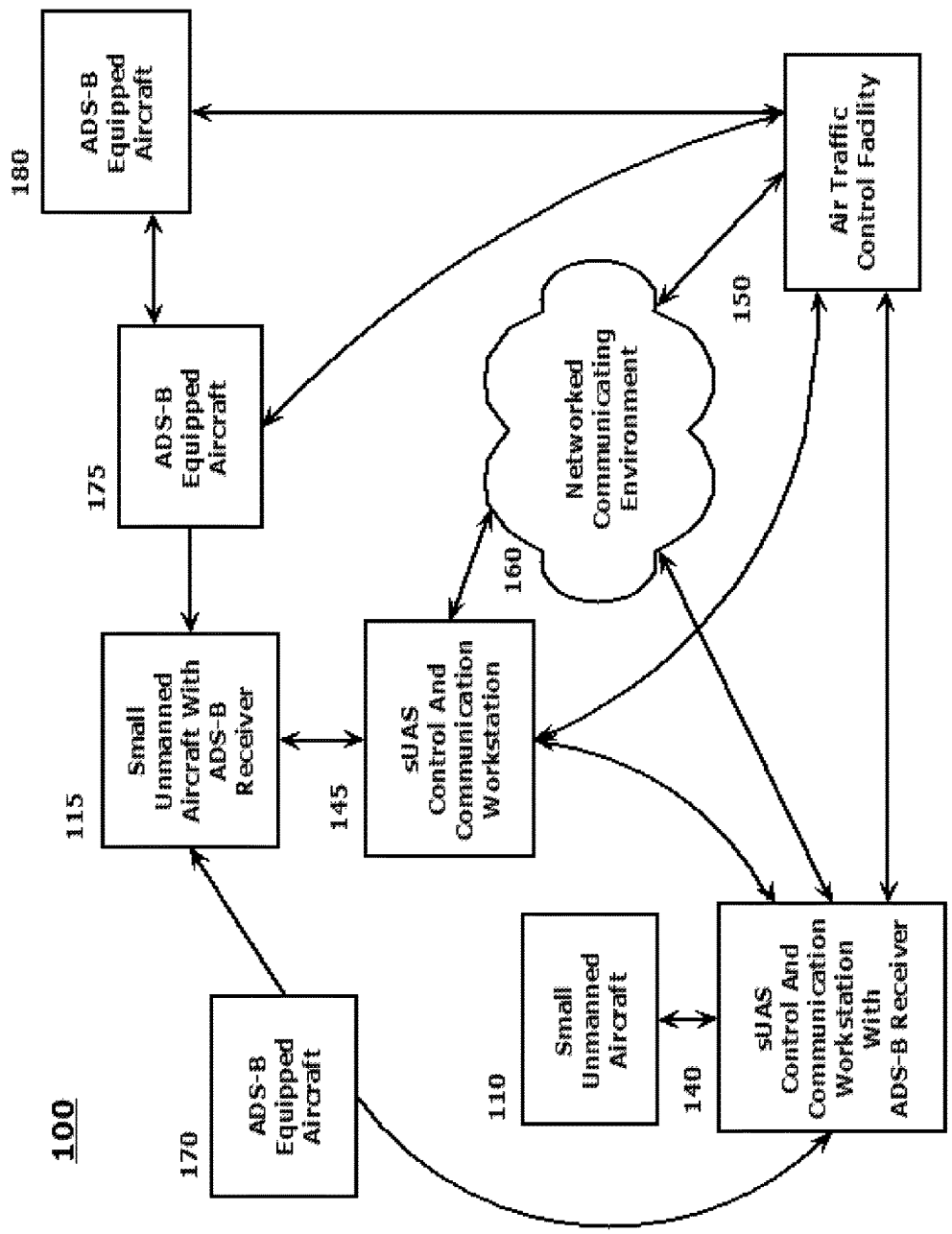
FIG. 1 illustrates an exemplary embodiment of an overview of an sUAS command and control network environment, in which remote monitoring for mission tracking and mission data acquisition for the sUAS, ADS-B information acquisition from cooperating manned aircraft in a vicinity of the sUAS, integrated situational awareness display development, and real-time data communication and messaging, may be implemented according to this disclosure.

The disclosed systems and methods for integrating automatic dependent surveillance-broadcast (ADS-B) capabilities in developing an enhanced situational awareness picture surrounding sUAS operations will generally refer to this specific utility for those systems and methods. Exemplary embodiments described and depicted in this disclosure should not be interpreted as being specifically limited to any particular configuration of an sUAS, the term "sUAS" as it is used throughout this disclosure referring to a system that includes a small unmanned aircraft or aerial platform, and a cooperating control and communication workstation by which an operator provides command, control and communication (C3) services with respect to operation of the small unmanned aircraft or aerial platform, except insofar as the disclosed systems and methods are based around incorporation of an ADS-B reception capabilities in the sUAS systems, either on or in the small unmanned aircraft or aerial platform, and/or the cooperating control and communication workstation. Any advantageous use of received ADS-B data in integration with interactive sUAS C3 systems for local situational awareness display, and using communication systems for integrating real-time, or near-real-time, information regarding this situational awareness picture, including other aerial activities in a vicinity of the one or more sUAS aerial platforms in a recognizable format for remote users is contemplated.

Specific reference to, for example, any particular sUAS component and/or any particular communication capability presented in this disclosure should be understood as being exemplary only, and not limiting, in any manner, to any particular class of sUAS aerial platforms or supporting ground-based control and communication workstations as those terms are understood by those of skill in the art, or to any communication link. The systems and methods according to this disclosure will be described as being particularly adaptable to employment scenarios for, and configurations of, sUASs in which the aerial vehicles are flown by an operator with a cooperating control and communication workstation, the operator having visual contact with the aerial platform for substantially all of a flight duration. One or both of the aerial platform and the control and communication workstation are augmented with an ADS-B receiver. Otherwise, the references to commonly understood sUAS operating components are meant to be illustrative only in providing a single real-world utility for the disclosed systems and methods, and should not be considered as limiting the disclosed systems and methods.

Additional features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations particularly pointed out in the appended claims.

Various embodiments of the disclosed embodiments are discussed in detail below. While specific implementations are discussed, it should be understood that this is done for illustration purposes only. A person skilled in the relevant art will recognize that other components and configurations may be used without departing from the spirit and scope of the disclosed embodiments.

ADS-B systems installed in aircraft generally include two avionics components—a high-integrity GPS navigation source and a datalink (ADS-B unit). ADS-B provides many benefits to both pilots and air traffic control that improve both the safety and efficiency of flight. These advantages include traffic separation as a pilot is able to view traffic information surrounding aircraft as the pilot is provided altitude, heading, speed, and distance to cooperating aircraft. In this regard, ADS-B makes flying significantly safer for the aviation community by providing pilots with improved situational awareness. The disclosed systems and methods expand that improved situational awareness to sUAS operators. Pilots in an ADS-B In equipped cockpit will have the ability to see, on their in-cockpit flight display, other traffic operating in the airspace. This capability is extended to sUAS operations with the display being provided on the sUAS control and communication workstation. Additionally, a communication capability is provided to fill potential gaps in ADS-B coverage for all stakeholders as may be beneficial in a particularly limited area for a particular timeframe.

FIG. 1 illustrates an exemplary embodiment of an overview 100 of an sUAS command and control network environment, in which remote monitoring for mission tracking and mission data acquisition for the sUAS, ADS-B information acquisition from cooperating manned aircraft in a vicinity of the sUAS, integrated situational awareness display development, and real-time data communication and messaging, may be implemented according to this disclosure.

As shown in FIG. 1, an exemplary C3 structure is proposed that accounts for the configuration of sUAS platforms and concepts regarding their intended employment. One or more small unmanned aircraft 110,115 may be operated by a cooperating sUAS control and communication workstation 140,145. The sUAS control and communication workstation 140,145 may preferably be operated by an operator that maintains line of sight visualization of the small unmanned aircraft 110,115 during flight, generally below 400 feet above ground level (AGL). One or the other of the small unmanned aircraft 115 and the sUAS control and communication workstation 140 may be configured with an ADS-B receiver. The depicted configuration does not preclude that all involved small unmanned aircraft 110,115, and sUAS control and communication workstations 140,145 may be configured with ADS-B receivers, or in any combination.

The sUAS control and communication workstations 140,145 may typically be comprised of a portable computing device in the form of a mobile ground station and/or laptop computer. The sUAS control and communication workstations 140,145 may enable a radio or other communication link for implementing two-way communications for flight control data communications with the small unmanned aircraft 110,115. The sUAS control and communication workstations 140,145 may separately enable a radio or other communication link for two-way communication (1) between separate sUAS control and communication workstations, or between the sUAS command and control workstations 140,145 and any remote stakeholder facility, depicted in FIG. 1 as an air traffic control (ATC) facility 150. As indicated, these radio or other communication links for two-way communication between the sUAS command and control workstations 140,145 may be direct communication links, or may be communication links established via some manner of networked communication environment 160.

Other aircraft operating in the area may be equipped with ADS-B transmitters. These ADS-B equipped aircraft 170,175,180 are typically able to establish communication with local air traffic control facilities such as air traffic control facility 150 as depicted. As indicated above, however, there may be certain gaps in coverage based on a proximity of the ADS-B equipped aircraft 170,175,180 to ADS-B receiving stations. Further, while it is recognized that that these aircraft have the capacity, particularly payload and electric power capacity to carry multiple communications devices and avionics, such as ADS-B transmitters and transponders (with associated power and antenna systems), the small unmanned aircraft 110,115 are not afforded with payload capacity to support such systems. The small unmanned aircraft 110,115 payload typically includes a ground station communications link enabling line of sight wireless communication between the small unmanned aircraft 110,115 and the respective corresponding sUAS control and communication workstation 140,145.

The small unmanned aircraft 110,115 may also carry various lightweight sensor packages, such as, for example, cameras and environmental sensors. The small unmanned aircraft 110,115 may pass sensor information and positioning to the respective corresponding sUAS control and communication workstation 140,145. In embodiments, position information for the small unmanned aircraft 110,115 may be by way of a miniature global positioning satellite (GPS) system receiver mounted on the small unmanned aircraft 110,115.

Augmenting one or the other or both of the small unmanned aircraft 110,115 and the sUAS control and communication workstation 140,145 with an ADS-B receiver can be accomplished without sacrificing, for example, available payload for the small unmanned aircraft 110,115. Such a receiver would afford an opportunity for the sUAS to collect transmitted ADS-B data from one or more of the ADS-B equipped aircraft 170,175,180 operating in a vicinity of the sUAS. Processing may then be undertaken locally in the sUAS control communication workstation 140,145 to process the received ADS-B data, and to integrate that data with, for example, location data received directly from the small unmanned aircraft 110,115, to be displayed as an integrated overall situational awareness picture for all aerial operations in proximity to the small unmanned aircraft 110,115. As indicated above, this locally generated integrated overall situational awareness picture may then be communicated via one or more of the established communication links to remote stakeholders in a format that is readily, or otherwise easily, integrated into the display systems of the remote stakeholders to enhance their overall situational awareness display.

Figure 2:
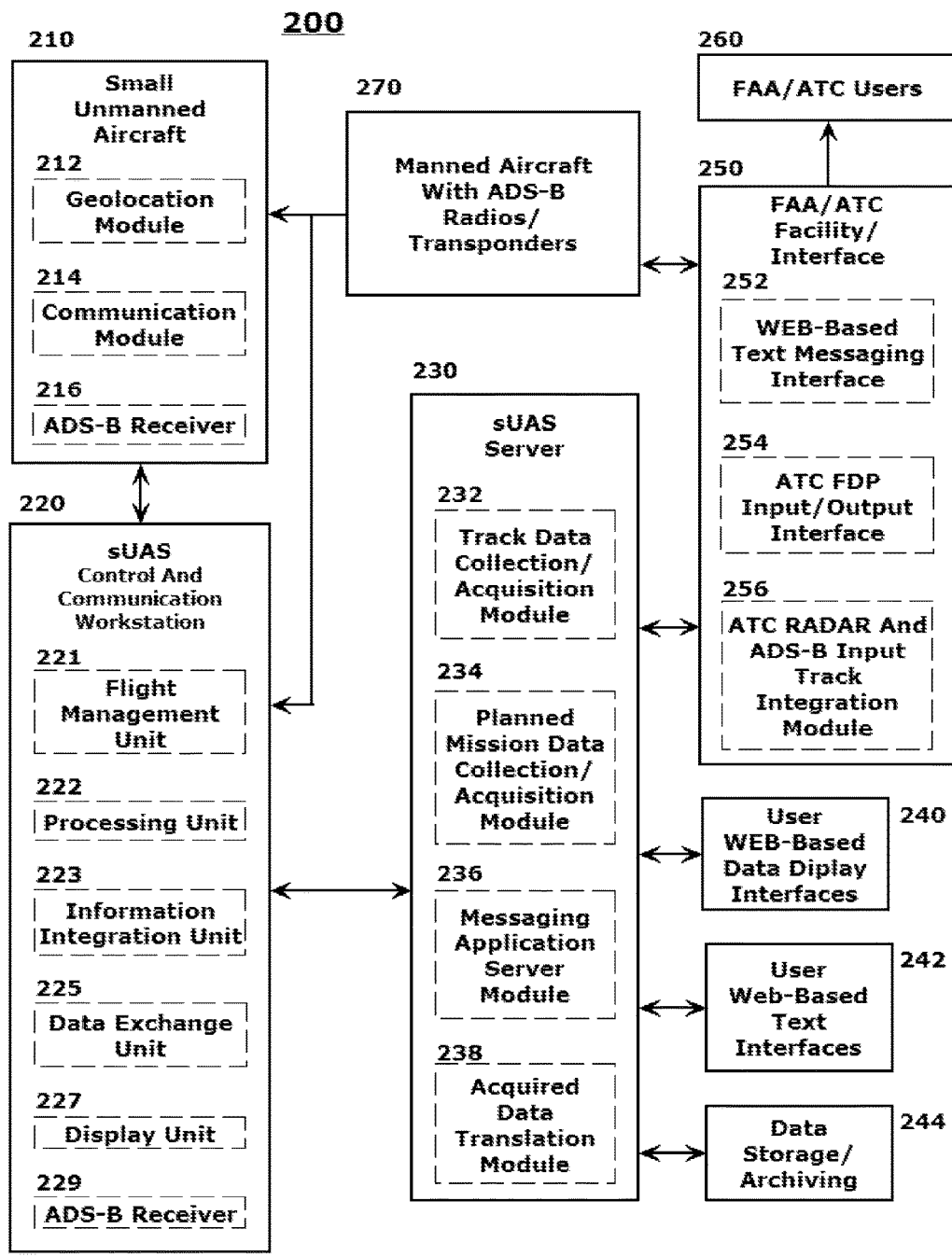
FIG. 2 illustrates an exemplary system that is operable as a more detailed sUAS command and control network environment in which remote monitoring for mission tracking and mission data acquisition for the sUAS, ADS-B information acquisition from cooperating manned aircraft in a vicinity of the sUAS, integrated situational awareness display development and real-time data communication and messaging, may be implemented according to this disclosure.

FIG. 2 illustrates an exemplary system that is operable as a more detailed sUAS command and control network environment in which remote monitoring for mission tracking and mission data acquisition for the sUAS, ADS-B information acquisition from cooperating manned aircraft in a vicinity of the sUAS, integrated situational awareness display development and real-time data communication and messaging, may be implemented according to this disclosure. As shown in FIG. 2, individual system components may be programmed to cooperatively provide the following capabilities:

Ground controller based track acquisition application (or application programming interface (API) or interface control/requirements document (ICD/IRD));

Local reception of ADS-B data from cooperating conventional aircraft operating ADS-B transponders in a vicinity of sUAS operations (ADS-B receiver);

Mission and/or flight plan extractor (or API or ICD/IRD);

Host- and/or server-based sUAS information (tracks and missions) repository and location conversion (pseudo ADS-B tracks);

Graphical situation display for planned mission and real-time locations; and

Integrated messaging capability.

The exemplary system 200 may include a small unmanned aircraft 210 that carries one or more sensors, including potentially carrying an ADS-B receiver 216 as, for example a small integrated receiving circuit. The small unmanned aircraft 210 may include a geolocation module 212 that may provide positioning information for the small unmanned aircraft 210 to the sUAS control and communication workstation 220. Sensor and positioning information may be transmitted from the small unmanned aircraft 210 to the sUAS control and communication workstation 220 via one or more communication module(s) 214, which may typically include a radio transceiver.

The exemplary system 200 may include a core system capability that enables the exemplary system 200 to generate a local overall situational awareness picture that may further be shared in real or near-real time with remote entities/user agencies. This core system capability may be implemented by electrical operating devices or functional units that may be housed integrally in, or externally connected to and in communication with the sUAS control and communication work station 220. The one or more devices or units may include a flight management unit 221 that may be used to facilitate mission control processing for operation of the small unmanned aircraft 210. The one or more devices may include a processing unit for controlling all information processing functions in the exemplary system 200 including information exchange processing with the small unmanned aircraft 210. The one or more devices or units may further include an information integration unit 223 that may recover mission specific data from the small unmanned aircraft 210 and ADS-B data received via one or more ADS-B receivers 216,229 from cooperating manned aircraft with ADS-B radio/transponders 270 in a vicinity of the exemplary system 200. The one or more devices or units may additionally include a data exchange unit 225 that facilitates data communication via one or more external communication links to, for example, an sUAS server 230, details of which will be discussed in greater detail below. The one or more devices or units may ultimately include a display unit 227 for displaying an integrated overall situational awareness picture for all aerial operations in a vicinity of the small unmanned aircraft 210.

In operation, the processing unit 221 may, for example, receive communications from the small unmanned aircraft 210 including at least position reference information for the small unmanned aircraft 210. The information integration unit 223 may integrate the positional information for the small unmanned aircraft 210 and with received positional information for the other manned aircraft with ADS-B radio/transponders 270 operating in the vicinity, the ADS-B positional information being communicated to the sUAS control and communication workstation 220 via the ADS-B receiver 229. In this matter, the information integration unit 223 may formulate an integrated overall situational awareness picture for all aerial operations in a vicinity of the small unmanned aircraft 210.

The data exchange unit 225 may package the overall situational awareness picture in a format that may be usable by downstream components and remote stakeholders, and may communicate the packaged information to those downstream entities by one or more communication links.

An sUAS server 230 may act as a data collection/acquisition control point for collecting information on an overall situational awareness picture including real-time positioning for a plurality of small unmanned aircraft 210 as provided to the sUAS server 230 by each respective sUAS control and communication workstation 220 associated with each small unmanned aircraft 210. Given that initial processing of the overall situational awareness picture may have been developed already in the sUAS control and communication workstation 220 as outlined above, the sUAS server 230 may simply provide a conduit to other downstream entities. Otherwise, further processing may be carried out in the sUAS server 230, which may be beyond the scope and capability of the processing available in the sUAS control and communication workstation 220.

Individual devices and/or functional modules may be provided in the sUAS server to facilitate the data collection/acquisition functions in the sUAS server 230. The sUAS server 230 may integrally include or may be otherwise connected to a storage unit for data storage/archiving 244. The sUAS server 230 may include one or more acquired data translation modules 238 that may be used, for example, to further translate the acquired overall situational awareness picture provided by one or more of the connected sUAS control and communication workstations 220 into a more user-friendly format, or multiple such formats for transmission to individual display components overseen by a number of remote stakeholders.

The sUAS server 230 may include a number of devices or functional modules for executing several other functional capabilities. These may include a track data collection/acquisition module 232 and a planned mission data collection/acquisition module 234 for processing track and mission data from the one or more sUAS control and communication workstations 220. A messaging application server module 236 may be provided to act as a text messaging gateway and for storage and archiving of the text messaging when one or more of the operating components supports only such information exchange.

The sUAS server 230 may communicate with each sUAS control and communication workstation 220, the data storage/archiving 244 server and end users and systems over a highly reliable and secure communications link, such as, for example, IP—GlobaLink. The end users and systems may include air traffic control facilities via FAA/ATC interface(s) 250, and user WEB-based data display interfaces 240 and user WEB-based text interfaces 242.

Many widely dispersed user WEB-based data display interfaces 240 may provide an ability to graphically view sUAS locations in near real-time overlaid on a depiction of other cooperating manned aircraft with ADS-B radio/transponders 270 to provide enhanced situational awareness pictures for all interested parties. An enhanced WebASD$^{SM}$ product is proposed as a suitable situational awareness display for sUAS users and interested parties. The attractiveness of a product such as WebASD$^{SM}$ is the capability of integrating the position or track display of one or all sUAS platforms with all other known aircraft as well as flight-related information such as weather phenomena, to provide a real airspace situation picture.

An FAA/ATC interface 250 may be provided in communication with the sUAS server 230 for facilitating communications with the FAA/ATC users 260. The FAA/ATC interface 250 may include individual operating modules: a dedicated WEB-based text messaging interface 252; an air traffic control flight data processing (ATC FDP) input/output interface 254; and an ATC RADAR track integration module 256. Civil Aviation Authorities worldwide employ integrated RADAR and various other synthetic position display technologies in order to view situation information to safely manage conventional aircraft traffic. Additionally, these authorities increasingly employ ADS-B communications to and from properly equipped aircraft. As such, a properly formatted overall situational awareness display may be easily integrated into existing display components operated by the various air traffic control entities to provide an enhanced situational awareness overview, and to potentially fill gaps in coverage where local events have precipitated a need for increased aerial operations at or below 400 feet AGL.

Situational or graphic displays depicting real-time location and intended routes may be achieved and integrated in several different ways to satisfy different user requirements or to be integrated into specific existing technologies. Methods of providing an integrated graphical display may include differing strategies.

Conversion of sUAS generated overall situational awareness pictures may be undertaken specifically to provide information in a format and protocol that can be integrated into existing air situation products, such as ARINC's proprietary WebASD$^{SM}$. Existing air situation products are implemented to currently acquire FAA RADAR information in near real-time and to supplement the FAA RADAR information with position report information. These products may provide highly configurable graphical aircraft situation displays and integrated real-time aircraft traffic pictures to registered users. The sUAS server 230 may format sUAS generated overall situational awareness pictures and forward formatted data to the existing air situation product, which would in turn provide users with an overall depiction of actual air traffic, including an sUAS of interest. The above-referenced related U.S. Patent Applications describe additional exemplary means by which to facilitate data exchange and integration with the myriad depicted components.

All of the various components of the exemplary system 200, as depicted in FIG. 2, may be connected internally, and to each other via combinations of wired and wireless communications to facilitate data, messaging and control exchange between the various interested parties operating the various components.

It should be appreciated that, although depicted in FIG. 2 as a series of separate discrete units with specific operating functionalities, the various disclosed elements of the exemplary system 200 may be arranged in any combination of sub-systems as individual components or combinations of components. In other words, no specific configuration is to be implied by the depiction in FIG. 2. Further, although depicted as individual units for ease of understanding of the details provided in this disclosure regarding the exemplary system 200, it should be understood that the described functions of any of the individually-depicted components may be undertaken, for example, by one or more processors within, connected to, and/or in communication with the system components.

Figure 3:
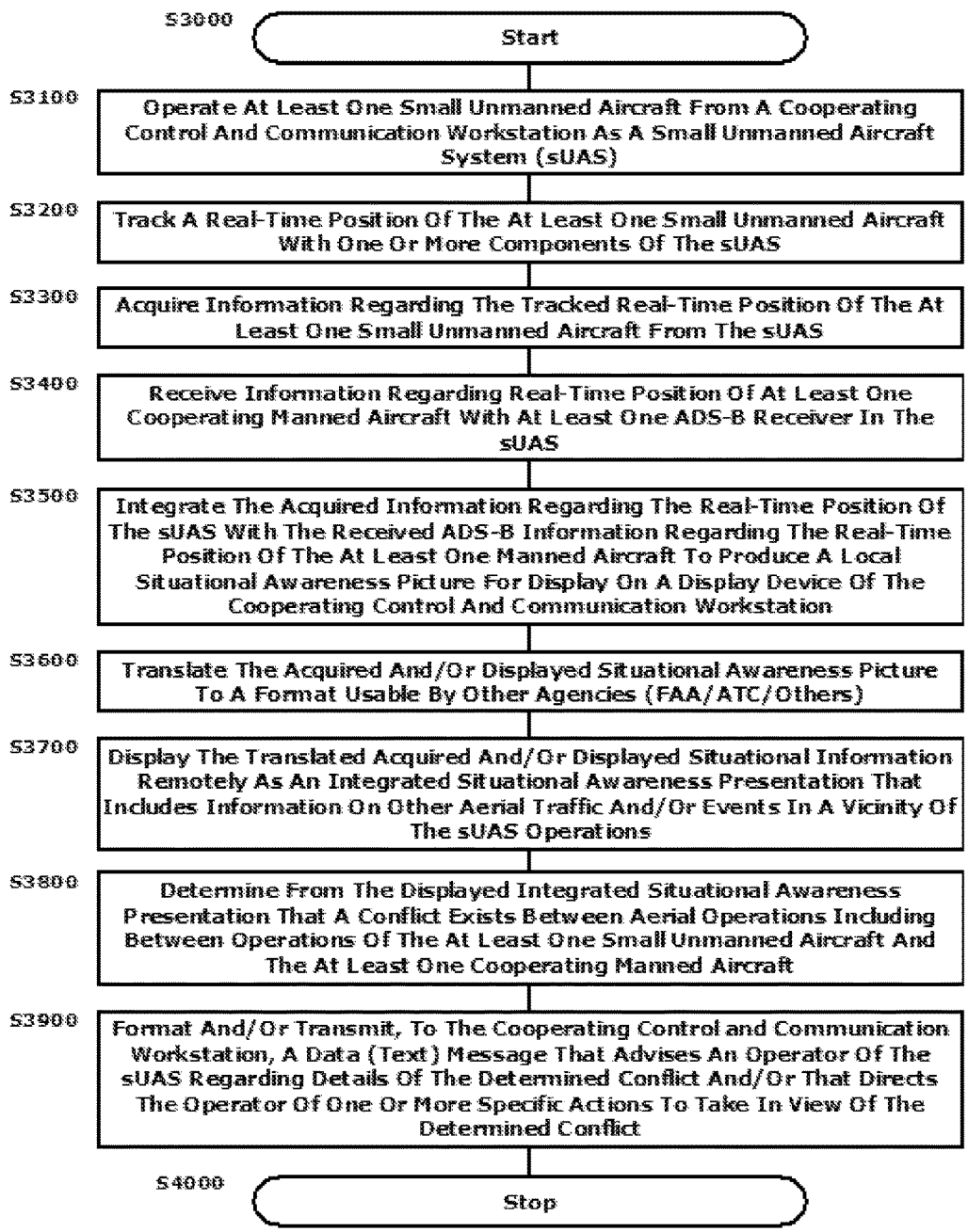
FIG. 3 illustrates a flowchart of an exemplary method for effecting remote monitoring for mission tracking and mission data acquisition for the sUAS, ADS-B information acquisition from cooperating manned aircraft in a vicinity of the sUAS, integrated situational awareness display development and real-time data communication and messaging according to this disclosure.

The disclosed embodiments may include an exemplary method for effecting remote monitoring for mission tracking and mission data acquisition for the sUAS, ADS-B information acquisition from cooperating manned aircraft in a vicinity of the sUAS, integrated situational awareness display development and real-time data communication and messaging. FIG. 3 illustrates an exemplary flowchart of such a method. As shown in FIG. 3, operation of the method commences at Step S3000 and proceeds to Step S3100.

In Step S3100, at least one small unmanned aircraft may be operated from an sUAS control and communication workstation. Operation of the method proceeds to Step S3200.

In Step S3200, a real-time position of the at least one small unmanned aircraft may be tracked by the sUAS control and communication workstation. Operation of the method proceeds to Step S3300.

In Step S3300, information may be extracted and processed regarding the tracked real-time position of the at least one small unmanned aircraft in the sUAS control and communication workstation. Operation of the method proceeds to Step S3400.

In Step S3400, an ADS-B receiver may be associated with the sUAS control and communication workstation. ADS-B information may be received and processed in the sUAS control and communication workstation regarding a real-time position of at least one manned aircraft operating an ADS-B radio/transponder. Operation of the method proceeds to Step S3500.

In Step S3500, the acquired information regarding the real-time position of the sUAS may be integrated with the received ADS-B information regarding the real-time position of the at least one manned aircraft to produce a local situational awareness picture for display on a display device of the cooperating control and communication workstation. Operation of the method proceeds to Step S3600.

In Step S3600, the acquired and/or displayed situational awareness picture may be translated to a format usable by other agencies or entities including, for example, the FAA, ATC facilities, law enforcement agencies, and/or other relevant stakeholders. Operation of the method proceeds to Step S3700.

In Step S3700, the translated situational awareness picture may be communicated to the other agencies or entities and displayed remotely as an integrated situational awareness presentation that includes information on other aerial traffic and/or events in the vicinity of the sUAS operations. Operation of the method proceeds to Step S3800.

In Step S3800, it may be determined from the displayed integrated situational awareness presentation locally or remotely that conflict has arisen between aerial platforms including the at least one small unmanned aircraft and/or the at least one cooperating manned aircraft. Operation of the method proceeds to Step S3900.

In Step S3900, a data (text) message may be formatted in or transmitted to the sUAS control and communication workstation controlling the operations of the small unmanned aircraft with which a conflict has arisen. The data (text) message may advise the sUAS operator in, for example, a pop-up window on the display of the sUAS control and communication workstation of details of the potential, or actual, conflict with the operator's operation of the small unmanned aircraft. The data (text) message may otherwise provide direction to the sUAS operator regarding immediate, and specific actions to be taken for maneuvering the small unmanned aircraft in order to remove the conflict. These actions may include direction to land the small unmanned aircraft and to temporarily cease further sUAS operations in the involved area. Operation of the method proceeds to Step 45000, where operation of the method ceases.

The disclosed embodiments may include a non-transitory computer-readable medium storing instructions which, when executed by a processor, may cause the processor to execute all, or at least some, of the functions to implement the steps of the method outlined above.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating operations of sUAS aerial platforms and operations with ADS-B equipped manned aircraft in the NAS using many and widely varied system components.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage devices that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 3, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual user, sUAS operator and interested stakeholder party, where each user may individually employ components of the disclosed system. This enables each user to enjoy the benefits of the disclosed embodiments even if any one of the large number of possible applications do not need some portion of the described functionality. In other words, there may be multiple instances of the disclosed system each processing the content in various possible ways. It does not necessarily need to be one system used by all end users. Accordingly, the appended claims and their legal equivalents should only define the disclosed embodiments, rather than any specific examples given.

I claim:

1. A system comprising:
   a control and communication workstation; and
   an unmanned aircraft system (UAS) aerial platform controlled by the control and communication workstation, the UAS aerial platform configured to operate within a line of sight of the control and communication workstation, the UAS aerial platform communicatively coupled to the control and communication workstation, the UAS aerial platform comprising:
   a global positioning system (GPS) receiver configured to receive GPS position information;
   a UAS aerial platform radio transceiver configured to communicate with the control and communication workstation;
   an automatic dependent surveillance-broadcast (ADS-B) receiver configured to receive ADS-B information broadcast by other manned and unmanned aircraft operating in a vicinity of the UAS aerial platform; and
   at least one UAS aerial platform processor configured to:
      receive control commands from the control and communication workstation via the UAS aerial platform radio transceiver;
      control operation of the UAS aerial platform based on the received control commands;
      receive the GPS position information;
      determine a position of the UAS aerial platform based at least on the received GPS position information;
      output the position of the UAS aerial platform to the UAS aerial platform radio transceiver for transmission to the control and communication workstation;
      receive the ADS-B information broadcast by the other manned and unmanned aircraft from the ADS-B receiver; and
      output the ADS-B information to the UAS aerial platform radio transceiver for transmission to the control and communication workstation;
   wherein the control and communication workstation comprises:
   at least one workstation radio transceiver configured to communicate with the UAS aerial platform and one or more remote receivers;
   a display configured to present graphical information to a user; and
   at least one workstation processor configured to:
      receive user inputs for controlling a flight profile of the UAS aerial platform;
      based at least on the user inputs, output the control commands for transmission to the UAS aerial platform via the at least one workstation radio transceiver;
      receive the ADS-B information and the position of the UAS aerial platform from the UAS aerial platform via the at least one workstation radio transceiver;
      based at least on the ADS-B information and the position of the UAS aerial platform, integrate information of the UAS aerial platform with information regarding the other manned and unmanned aircraft operating in the vicinity of the UAS aerial platform;
      generate a situational awareness picture of the UAS aerial platform and the other manned and unmanned aircraft operating in the vicinity of the UAS aerial platform based at least on the ADS-B information and the position of the UAS aerial platform;

output the situational awareness picture to the display for presentation to the user;

format information associated with the situational awareness picture into a format suitable for use by at least one remote processor communicatively coupled to the one or more remote receivers;

output the formatted information associated with the situational awareness picture to the at least one workstation radio transceiver for transmission to the one or more remote receivers;

output flight related information of the UAS aerial platform to the display for presentation to the user; and receive a message including an indication of a potential or actual conflict with operation of the UAS aerial platform.

2. The system of claim 1, wherein the one or more remote receivers are connected to the at least one workstation radio transceiver via the internet.

3. The system of claim 1, wherein at least one of the one or more remote receivers are implemented in an air traffic control facility, the formatted information associated with the situational awareness picture being in a format for integration into air traffic control displays in the air traffic control facility.

4. The system of claim 1, at least one of the one or more remote receivers being communicatively coupled to a computing device interfaceable by a Web-based user, the formatted information associated with the situational awareness picture being in a format for integration with a mapping program on a display device operated by the Web-based user.

5. The system of claim 1, wherein the received message further includes a directive for the user to take an action to maneuver the UAS aerial platform so as to remove the potential or actual conflict.

6. A method of operating a system including a control and communication workstation and an unmanned aircraft system (UAS) aerial platform controlled by the control and communication workstation, the UAS aerial platform communicatively coupled to the control and communication workstation, wherein the UAS aerial platform includes a global positioning system (GPS) receiver, a UAS aerial platform radio transceiver, an automatic dependent surveillance-broadcast (ADS-B) receiver, and at least one UAS aerial platform processor, wherein the control and communication workstation includes at least one workstation radio transceiver, a display, and at least one workstation processor, the method comprising:

receiving, by the GPS receiver, GPS position information;

communicating, by the UAS aerial platform radio transceiver, with the control and communication workstation;

receiving, by the ADS-B receiver, ADS-B information broadcast by other manned and unmanned aircraft operating in a vicinity of the UAS aerial platform;

receiving, by the at least one UAS aerial platform processor, control commands from the control and communication workstation via the UAS aerial platform radio transceiver;

controlling, by the at least one UAS aerial platform processor, operation of the UAS aerial platform based on the received control commands;

receiving, by the at least one UAS aerial platform processor, the GPS position information;

determining, by the at least one UAS aerial platform processor, a position of the UAS aerial platform based at least on the received GPS position information;

outputting, by the at least one UAS aerial platform processor, the position of the UAS aerial platform to the UAS aerial platform radio transceiver for transmission to the control and communication workstation;

receiving, by the at least one UAS aerial platform processor, the ADS-B information broadcast by the other manned and unmanned aircraft from the ADS-B receiver;

outputting, by the at least one UAS aerial platform processor, the ADS-B information to the UAS aerial platform radio transceiver for transmission to the control and communication workstation;

communicating, by the at least one workstation radio transceiver, with the UAS aerial platform and one or more remote receivers;

receiving, by the at least one workstation processor, user inputs for controlling a flight profile of the UAS aerial platform;

based at least on the user inputs, outputting, by the at least one workstation processor, the control commands for transmission to the UAS aerial platform via the at least one workstation radio transceiver;

receiving, by the at least one workstation processor, the ADS-B information and the position of the UAS aerial platform from the UAS aerial platform via the at least one workstation radio transceiver;

based at least on the ADS-B information and the position of the UAS aerial platform, integrating, by the at least one workstation processor, information of the UAS aerial platform with information regarding the other manned and unmanned aircraft operating in the vicinity of the UAS aerial platform;

generating, by the at least one workstation processor, a situational awareness picture of the UAS aerial platform and the other manned and unmanned aircraft operating in the vicinity of the UAS aerial platform based at least on the ADS-B information and the position of the UAS aerial platform;

outputting, by the at least one workstation processor, the situational awareness picture to the display for presentation to the user;

formatting, by the at least one workstation processor, information associated with the situational awareness picture into a format suitable for use by at least one remote processor communicatively coupled to the one or more remote receivers;

outputting, by the at least one workstation processor, the formatted information associated with the situational awareness picture to the at least one workstation radio transceiver for transmission to the one or more remote receivers;

outputting, by the at least one workstation processor, flight related information of the UAS aerial platform to the display for presentation to the user; and receiving, by the at least one workstation processor, a message including an indication of a potential or actual conflict with operation of the UAS aerial platform, wherein the UAS aerial platform is configured to operate within a line of sight of the control and communication workstation.

7. The method of claim 6, wherein communicating, by the at least one workstation radio transceiver, with the UAS aerial platform and one or more remote receivers further comprises: communicating, by the at least one workstation radio transceiver, with the UAS aerial platform and one or more remote receivers connected to the at least one workstation radio transceiver via the internet.

8. The method of claim 6, wherein communicating, by the at least one workstation radio transceiver, with the UAS aerial platform and one or more remote receivers further comprises: communicating, by the at least one workstation radio transceiver, with the UAS aerial platform and one or more remote receivers implemented in an air traffic control facility, the formatted information associated with the situational awareness picture being in a format for integration into air traffic control displays operated by the air traffic control facility.

9. The method of claim 6, wherein communicating, by the at least one workstation radio transceiver, with the UAS aerial platform and one or more remote receivers further comprises: communicating, by the at least one workstation radio transceiver, with the UAS aerial platform and one or more remote receivers communicatively coupled to a computing device interfaceable by a Web-based user, the formatted information associated with the situational awareness picture being in a format for integration with a mapping program on a display device operated by the Web-based user.

10. The method of claim 6, wherein receiving, by the at least one workstation processor, a message including an indication of a potential or actual conflict with operation of the UAS aerial platform further comprises: receiving, by the at least one workstation processor, a message including an indication of a potential or actual conflict with operation of the UAS aerial platform and a directive for the user to take an action to maneuver the UAS aerial platform so as to remove the potential or actual conflict.

* * * * *